US008063501B2

(12) United States Patent
Finney

(10) Patent No.: US 8,063,501 B2
(45) Date of Patent: Nov. 22, 2011

(54) GAS TURBINE BLEED ENERGY RECOVERY VIA COUNTER ROTATING GENERATOR

(75) Inventor: Adam M. Finney, Rocky Hill, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 343 days.

(21) Appl. No.: 12/482,092

(22) Filed: Jun. 10, 2009

(65) Prior Publication Data
US 2010/0314877 A1 Dec. 16, 2010

(51) Int. Cl.
*F02C 7/32* (2006.01)
(52) U.S. Cl. ......................................................... 290/52
(58) Field of Classification Search ...................... 290/52
See application file for complete search history.

(56) References Cited

U.S. PATENT DOCUMENTS

| 3,514,945 | A | | 6/1970 | Austin |
| 5,125,597 | A | | 6/1992 | Coffinberry |
| 5,137,230 | A | | 8/1992 | Coffinberry |
| 5,363,641 | A | | 11/1994 | Dixon et al. |
| 5,452,573 | A | * | 9/1995 | Glickstein et al. ............... 60/782 |
| 5,482,229 | A | | 1/1996 | Asshauer |
| 5,911,388 | A | | 6/1999 | Severson et al. |
| 6,124,646 | A | * | 9/2000 | Artinian et al. .................. 290/52 |
| 6,283,410 | B1 | | 9/2001 | Thompson |
| 6,316,841 | B1 | | 11/2001 | Weber |
| 6,603,233 | B2 | | 8/2003 | Strohm |
| 6,639,337 | B1 | | 10/2003 | Nakano |
| 6,662,575 | B2 | * | 12/2003 | Clarke ............................... 62/87 |
| 6,710,492 | B2 | | 3/2004 | Minagawa |
| 7,059,136 | B2 | | 6/2006 | Coffinberry |
| 7,285,871 | B2 | * | 10/2007 | Derouineau ...................... 290/52 |
| 7,578,136 | B2 | * | 8/2009 | Derouineau et al. ............ 62/172 |
| 7,970,497 | B2 | * | 6/2011 | Derouineau et al. .............. 701/3 |
| 2006/0010875 | A1 | * | 1/2006 | Mahoney et al. ................ 60/772 |
| 2006/0042227 | A1 | * | 3/2006 | Coffinberry ................. 60/226.1 |
| 2007/0017226 | A1 | | 1/2007 | Butt et al. |

FOREIGN PATENT DOCUMENTS

| EP | 1619370 A1 | | 1/2006 |
| JP | 2011012675 A | * | 1/2011 |

* cited by examiner

*Primary Examiner* — Joseph Waks
(74) *Attorney, Agent, or Firm* — Kinney & Lange, P.A.

(57) ABSTRACT

A gas turbine engine includes a main compressor section for compressing air, a main combustor section positioned downstream of the main compressor section, a main turbine section positioned downstream of the main combustor section, and a spool extending from the main compressor section to the main turbine section. A second turbine is fluidically connected to the main compressor section by a bleed passage. An electrical generator is mechanically driven by both the spool and the second turbine.

15 Claims, 1 Drawing Sheet

GAS TURBINE BLEED ENERGY RECOVERY VIA COUNTER ROTATING GENERATOR

BACKGROUND

The present invention relates to gas turbine engine bleed air, and in particular to the use of air bled from a gas turbine engine compressor.

In a typical gas turbine engine, a compressor compresses air and passes that air along a primary flow path to a combustor which mixes fuel with the compressed air and combusts the mixture. The combusted mixture expands and is passed to a turbine which is forced to rotate. When used on an aircraft, the primary purpose of this system is to provide propulsive force for the aircraft.

In some gas turbine engines, a portion of the air compressed by the compressor is diverted from the primary flow path to a bleed passage of a bleed air system. This bleed air is typically used for a variety of purposes, such as to de-ice a wing or to provide pressurized air to a cabin of the aircraft. Because the bleed air is often at an undesirably high temperature, a heat exchanger is used to cool the bleed air. Bleeding off and cooling compressed air typically does not generate thrust or useful work, thus reducing the efficiency of the compressor and the entire gas turbine engine. Moreover, the heat exchanger takes up a relatively large amount of space and undesirably increases the overall weight of the bleed air system.

SUMMARY

According to the present invention, a gas turbine engine includes a main compressor section for compressing air, a main combustor section positioned downstream of the main compressor section, a main turbine section positioned downstream of the main combustor section, and a spool extending from the main compressor section to the main turbine section. A second turbine is fluidically connected to the main compressor section by a bleed passage. An electrical generator is mechanically driven by both the spool and the second turbine.

Another embodiment includes a method for operating a gas turbine engine on an aircraft. The method includes supplying air from a main compressor through a main flow path to drive a main turbine and through a bleed passage to drive a second turbine, generating electrical power with a generator mechanically driven by both the main turbine and the second turbine, and supplying air from the second turbine to a cabin of the aircraft.

DETAILED DESCRIPTION

Figure 1:
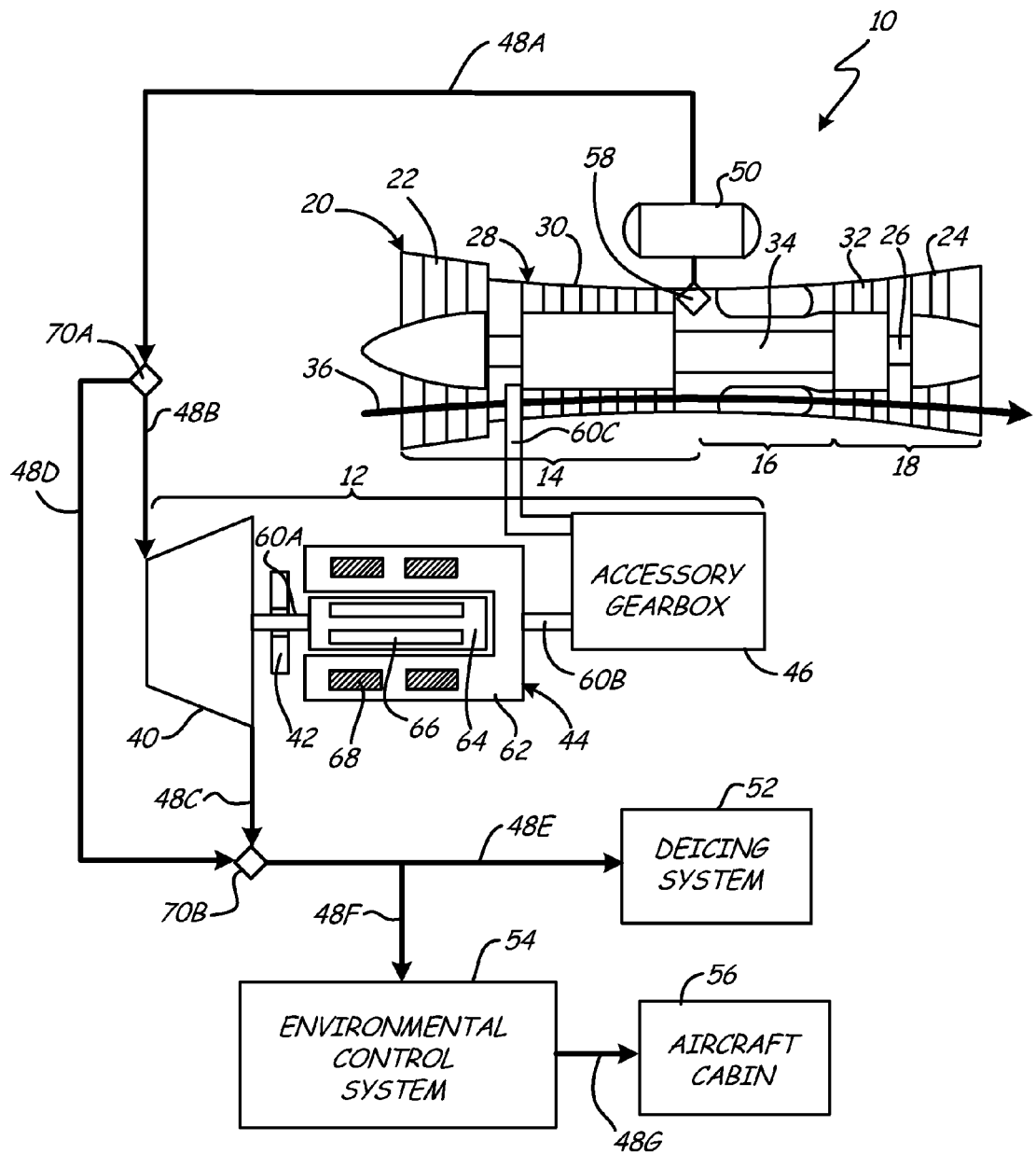
FIG. 1 is a schematic view of a gas turbine engine having a bleed energy recovery system.

FIG. 1 is a schematic view of gas turbine engine 10 having bleed energy recovery system 12. Gas turbine engine 10 includes main compressor section 14, main combustor section 16, and main turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from main compressor section 14 to main turbine section 18. Air flows from main compressor section 14 to main turbine section 18 along main flow part 36.

The general construction and operation of gas turbine engines is well-known in the art, and therefore detailed discussion here is unnecessary.

Bleed energy recovery system 12 includes second turbine 40, locking mechanism 42, generator 44, and accessory gearbox 46. Bleed passages 48A-48G (collectively referred to as bleed passage 48) fluidically connects main compressor section 14 to heat exchanger 50, second turbine 40, deicing system 52, environmental control system (ECS) 54, and aircraft cabin 56. Bleed passage 48A connects to main compressor section 14 at bleed valve 58. Bleed valve 58 can be positioned anywhere along main compressor section 14 where pressure is at least high enough to meet the needs of deicing system 52 and ECS 54. In the illustrated embodiment, bleed valve 58 is positioned downstream of high pressure compressor 30 to reduce negative effects on flow within main compressor section 14. Because bleed valve 58 is so far downstream along main flow path 36, air entering bleed passage 48A is at a pressure and temperature substantially higher than what is needed by deicing system 52 and ECS 54. Typically, safety requirement dictate that bleed air temperature be below a threshold, such as 450 degrees Fahrenheit (about 232 Celsius), prior to entering a wing or cabin of an aircraft. Thus, bleed energy recovery system 12 is used to extract energy from the bleed air and convert it to useful energy.

Bleed air in bleed passage 48B passes into an inlet of second turbine 40, drives second turbine 40, and passes out an outlet of second turbine 40 to bleed passage 48C. Second turbine 40 extracts enough energy from the bleed air to drop pressure and temperature to suitable levels, below any safety thresholds. If second turbine 40 is not able to reduce temperature and pressure by a desired amount, a heat exchanger can be added to remove additional energy. In the illustrated embodiment, heat exchanger 50 is a relatively small precooler positioned along bleed passage 48A. Heat exchanger 50, combined with second turbine 40, reduce temperature and pressure of the bleed air to desired levels. In other embodiments, heat exchanger 50 can be omitted and second turbine 40 can reduce bleed air temperature below the threshold by itself.

Second turbine 40 is mechanically connected to and drives generator 44 via shaft 60A. Generator 44 is mounted on accessory gearbox 46 and connected to gearing in accessory gearbox 46 via shaft 60B. Accessory gearbox 46 is connected to and driven by high pressure spool 28 via shaft 60C. Thus, generator 44 is driven by both high pressure turbine 32 (as part of high pressure spool 28) as well as second turbine 40.

In the illustrated embodiment, generator 44 is a counter rotating electrical generator. Generator 44 includes first rotor 62 and second rotor 64. Magnetic field producer 66 is positioned on first rotor 62, and armature 68 is positioned on second rotor 64. Magnetic field producer 66 can be a set of permanent magnets or electromagnets formed by conducting coils. Armature 68 can be a set of conducting coils or windings for carrying current induced by magnetic field producer 66. In operation, high pressure spool 28 drives first rotor 62 to rotate in a first direction while second turbine 40 drives second rotor 64 to rotate in an opposite direction. This allows generator 44 to produce electricity for various accessories such as for ECS 54, lights, avionics, television monitors, and other accessories on gas turbine engine 10 and throughout the aircraft.

In an alternative embodiment, generator 44 need not be a counter rotating generator as illustrated. Instead, generator 44 can be a counter rotating generator of another design. In further alternative, generator 44 can be a conventional generator with one rotor and one stator. As a conventional generator, second turbine 40 can still drive generator 44 at the same time as high pressure spool 28 by using a multi-ratio transmission, such as a continuously variable transmission, to connect second turbine 40 to generator 44. The multi-ratio transmission allows second turbine 40 to drive generator 44 without having its speed dependant on that of high pressure spool 28.

So long as gas turbine engine 10 is operating normally, at relatively high speeds, bleed air in bleed passage 48 requires energy removal by second turbine 40. In some situations, however, passing bleed air through second turbine 40 would reduce its temperature and pressure below desirable levels. Such situations can occur when gas turbine engine 10 is operating at relatively low speeds and in particularly cold environments. In those situations, some or all of the bleed air can be diverted at bypass valve 70A, passed through bleed passage 48D, and returned back at bypass valve 70B. Bleed passage 48D acts as a bypass passage to bypass second turbine 40. Thus, bleed air can be supplied to deicing system 52 and ECS 54 at suitable temperature and pressure even when bleed air enters bleed valve 58 at relatively low temperature and pressure.

If most or all bleed air is diverted around second turbine 40, it will not effectively rotate second rotor 64. In order to allow generator 44 to continue generating electricity, locking mechanism 42 can "lock" or limit rotation of both second turbine 40 and second rotor 64. When locked, second rotor 64 can act as a stator, allowing generator 44 to act as a conventional generator.

Bleed air provided to deicing system 52 can be used to remove ice from wings on the aircraft. Bleed air provided to ECS 54 can be further conditioned to a temperature and pressure suitable for supplying to aircraft cabin 56. The conditioned bleed air provides a comfortable temperature, pressure, and level of oxygen for passengers on the aircraft.

It will be recognized that the present invention provides numerous benefits and advantages. For example, by removing heat and pressure from the bleed air with second turbine 40, a relatively large heat exchange need not be used. Even if a relatively small heat exchanger, such as heat exchanger 50, is still needed, total weight of gas turbine engine can be reduced. Moreover, by connecting second turbine 40 to generator 44, the excess energy in the bleed air can be converted to useful energy instead of simply dumped to the atmosphere as heat. Connecting second turbine 40 and high pressure spool 28 to the same generator 44 avoids the extra weight of having an additional generator. This can be done relatively efficiently because generator 44 is a counter rotating generator. Locking mechanism 42 allows second rotor 64 to act as a stator, which allows generator 44 to continue generating electricity when driven by high pressure spool 28, even when bleed air bypasses second turbine 40. Ultimately, gas turbine engine 10 has less weight, more space, and better efficiency.

While the invention has been described with reference to a exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, generator 44 could be driven by low pressure spool 20 instead of high pressure spool 28. Additionally, configuration of bleed energy recovery system 12 can be modified from the illustrated configuration so long as generator 44 is driven by both second turbine 40 and one of the high or low pressure spools.

The invention claimed is:

1. A gas turbine engine comprising:
   a main compressor section for compressing air;
   a main combustor section positioned downstream of the main compressor section;
   a main turbine section positioned downstream of the main combustor section;
   a spool extending from the main compressor section to the main turbine section;
   a second turbine fluidically connected to the main compressor section by a bleed passage; and
   a counter-rotating electrical generator having a first rotor mechanically driven by the spool and a second rotor mechanically driven by the second turbine.

2. The gas turbine engine of claim 1, and further comprising:
   a locking mechanism for limiting rotation of the second rotor.

3. The gas turbine engine of claim 2, wherein the second rotor and the second turbine are substantially stationary with respect to the bleed passage when the locking mechanism is locked.

4. The gas turbine engine of claim 1, and further comprising:
   a heat exchanger positioned along the bleed passage.

5. The gas turbine engine of claim 1, wherein one of the first and second rotors includes a magnetic field producer and the other of the first and second rotors includes an armature.

6. The gas turbine engine of claim 1, wherein the first rotor of the counter-rotating electrical generator rotates in a first direction when air flows through the main turbine and the second rotor rotates in a second direction when air from the bleed passage flows through the second turbine.

7. The gas turbine engine of claim 1, wherein the spool is a high pressure spool.

8. The gas turbine engine of claim 1, and further comprising:
   an accessory gearbox having gearing for connecting the spool to the first rotor.

9. The gas turbine engine of claim 1, and further comprising:
   a bypass fluidically connected to the bleed passage both upstream and downstream of the second turbine; and
   a bypass valve for selectively directing air flow to either the bypass or the second turbine.

10. A method for operating a gas turbine engine on an aircraft, the method comprising:
    supplying air from a main compressor through a main flow path to drive a main turbine and through a bleed passage to drive a second turbine;
    generating electrical power with a generator mechanically driven by both the main turbine and the second turbine; and
    supplying air from the second turbine to a cabin of the aircraft.

11. The method of claim 10, wherein the generator is simultaneously driven by both the main turbine and the second turbine under a first set of operating conditions and wherein the generator is driven by only the main turbine under a second set of operating conditions.

12. The method of claim 11, wherein the first set of operating conditions includes pressure upstream of the second turbine having a value above a threshold and the second set of operating conditions includes pressure upstream of the second turbine having a value below the threshold.

13. The method of claim 10, and further comprising:
supplying air from the second turbine to a wing de-icing system.

14. The method of claim 10, and further comprising:
removing heat from the air in the bleed passage with a heat exchanger fluidically positioned along the bleed passage between the main compressor and the second turbine.

15. The method of claim 10, and further comprising:
rotating a magnetic field producer of the generator in a first direction with respect to the aircraft; and rotating an armature of the generator in a second direction with respect to the aircraft.

\* \* \* \* \*